United States Patent [19]

Cerceau et al.

[11] Patent Number: 4,650,776

[45] Date of Patent: Mar. 17, 1987

[54] CUBIC BORON NITRIDE COMPACT AND METHOD OF MAKING

[75] Inventors: Jean-Michel Cerceau, Seyssinut Pariset, France; H. Tracy Hall, Jr., Orem, Utah

[73] Assignees: Smith International, Inc., Irvine, Calif.; Societe Industrielle De Combustible Nucleaire, Velizy Villacoubly, France

[21] Appl. No.: 703,288

[22] Filed: Feb. 20, 1985

Related U.S. Application Data

[63] Continuation-in-part of Ser. No. 666,459, Oct. 30, 1984.

[51] Int. Cl.$^4$ ............................................. C04B 35/58
[52] U.S. Cl. ........................................ 501/96; 51/307; 51/309; 75/238
[58] Field of Search ..................... 501/96; 423/290; 51/307, 309; 75/238

[56] References Cited

U.S. PATENT DOCUMENTS

| | | | |
|---|---|---|---|
| 3,743,489 | 7/1973 | Wentorf, Jr. et al. | 51/307 |
| 3,852,099 | 12/1974 | Prochazka | 117/119 |
| 3,918,219 | 11/1975 | Wentorf, Jr. et al. | 51/307 |
| 3,944,398 | 3/1976 | Bell | 51/307 |
| 3,959,443 | 5/1976 | Kabayama | 423/290 |
| 4,151,686 | 5/1979 | Lee et al. | 51/307 |
| 4,220,455 | 9/1980 | St. Pierre et al. | 51/295 |
| 4,238,433 | 12/1980 | Hillig et al. | 264/60 |
| 4,242,106 | 12/1980 | Morelock | 51/307 |
| 4,247,304 | 1/1981 | Morelock | 51/295 |
| 4,334,928 | 6/1982 | Hara et al. | 51/307 X |
| 4,343,651 | 8/1982 | Yazu et al. | 75/238 |
| 4,353,714 | 10/1982 | Lee et al. | 51/295 |
| 4,353,953 | 10/1982 | Morelock | 428/213 |
| 4,361,543 | 11/1982 | Zhdanovich et al. | 423/290 |
| 4,375,517 | 3/1983 | Watanabe et al. | 501/87 |
| 4,381,271 | 4/1983 | Hayden | 51/295 |
| 4,394,170 | 7/1983 | Sawaoka et al. | 51/309 X |
| 4,401,443 | 8/1983 | Lee et al. | 51/307 |

FOREIGN PATENT DOCUMENTS 58-61254  4/1983  Japan ..................................... 501/96

*Primary Examiner*—William R. Dixon, Jr.
*Assistant Examiner*—Steven Capella
*Attorney, Agent, or Firm*—Willian, Brinks, Olds, Hofer, Gilson & Lione Ltd.

[57] ABSTRACT

The invention is a process for preparing a sintered polycrystalline compact of cubic boron nitride (CBN) with substantial intercrystalline bonding, together with the compact produced by the process. A carbon containing material, such as diamond or graphite, is added to a binder material which comprises elemental silicon. The carbon from the carbon containing material reacts with the silicon to form silicon carbide. Having silicon carbide as a constituent of the final product is preferable to having elemental silicon because the silicon carbide does not expand on cooling, and is also harder and more wear resistant than elemental silicon. In this way, the benefits of using elemental silicon in a binder system to enhance intercrystalline bonding of the CBN are realized while avoiding the disadvantages otherwise present. Another advantage is provided in the compact of this invention may be cut into precision shapes with a conventional Electric Discharge Machine (EDM).

37 Claims, No Drawings

CUBIC BORON NITRIDE COMPACT AND METHOD OF MAKING

CROSS-REFERENCE TO RELATED APPLICATIONS

This application is a continuation-in-part of application Ser. No. 666,459, filed by the same two inventors on Oct. 30, 1984 and assigned to the same assignee.

BACKGROUND OF THE INVENTION

This invention relates to sintered polycrystalline compacts of cubic boron nitride for use in machining tools, abrasives, wire dies, wear parts, heat sinks, and the like. More particularly, this invention relates to a processes for preparing a sintered polycrystalline compact of cubic boron nitride, and the compacts produced thereby.

The high pressure forms of boron nitride, known as cubic boron nitride and wurzitic boron nitride, are surpassed only by diamond in hardness and wear resistance. Wurzitic boron nitride, typically formed by shock or explosive techniques, has a hardness equal to the cubic form and can be substituted or mixed with the cubic form. The Wurzitic form of boron nitride is thermodynamically unstable relative to the cubic form under conditions favorable to sintering and will therefore revert to the cubic form in the presence of catalyst/solvents. For convenience, the abbreviation "CBN" is intended by the inventors in the following disclosure and claims to refer to both the cubic and the wurzitic high pressure form of boron nitride.

In similar fashion as diamond, CBN has proven particularly useful when made into a bonded polycrystalline mass, often referred to as a "sintered CBN compact" or simply a "CBN compact". In particular, CBN compacts are preferred to diamond compacts in certain applications, such as working with ferrous metals, because CBN is chemically more stable than diamond.

Although it is possible to form a sintered CBN compact with no binder material under conditions of high pressure and temperature, strongly adherent surface oxides of boron inhibit intergranular bonding and make it difficult, if not impossible, to obtain adequate compact strength. Various binder materials are thus incorporated, either to enhance intercrystalline bonding or to surround the grains with a continuous adhering and/or supporting matrix. It is this first type of binder, i.e. one that enhances intercrystalline or "CBN to CBN" bonding and is sometimes called a catalyst/binder, with which the present invention is concerned. In particular, the invention is an improvement in binder systems which use elemental silicon (including alloys of silicon) to promote this intercrystalline bonding. This is to be distinguished from the various processes which use silicon and its compounds to produce the matrix type binder system for a CBN compact. For example, see U.S. Pat. No. 4,353,953 to Morelock and U.S. Pat. No. 4,110,084 to Lee which both show the use of a silicon carbide containing matrix for supporting crystals of CBN.

Silicon has several properties which have made it a desirable constituent in a catalyst/binder system for forming polycrystalline CBN compacts with substantial intercrystalline or CBN to CBN bonding. First, silicon is essentially non-reactive with boron nitride. Second boron nitride is virtually insoluble in silicon. Third, silicon does form a variety of alloys and intermetallic compounds with many substances which do react with boron nitride. For example, aluminum, the lanthanides, transition metals such as molybdenum, tungsten, titanium, zirconium, and halfnium all form such alloys and intermetallic compounds with silicon. As a result of these first three properties, silicon can be used in combination with these materials which do react with CBN as a diluent to limit or regulate the extent of interaction with the CBN. Silicon is thus used to enable controlled dissolution and recystallization of CBN, thereby enhancing the formation of intergranular bonding in the compact.

A fifth property which makes silicon a desirable ingredient in catalyst/binder systems for CBN compacts is its ability to promote wetting and bonding between the CBN and a wide variety of refractory hard-metal and ceramic materials which can also be present in the binder. A sixth property is that, in contrast to most other materials, the liquid phase of silicon is more dense than the solid phase. As a result, the application of high pressures substantially reduces the melting point of silicon thereby making it more active as a solvent at lower temperatures.

An example of the benefits derived from using elemental silicon in a catalyst/binder system for a polycrystalline CBN compact is taught in the inventors' co-pending U.S. patent application Ser. No. 666,459. In this application, the inventors teach a binder system comprising elemental silicon together with an aluminum containing material. The compact produced possesses substantial intercrystalline bonding.

However, one problem which the present inventors did note in the compacts produced by the above-described process, was an excessive amount of cracking of the compacts during cooling at normal rates. In particular, a high percentage of these compacts had to be rejected due to this cracking of the polycrystalline structure. The inventors deduced that the problem was due, at least in part, to the presence of the elemental silicon in the compact. That is, as to the compact cooled, the silicon reverted to the solid phase and expanded within the pores of the polycrystalline network. Therefore, although the peculiar property of silicon being less dense in the solid phase proved beneficial at the time of the formation of the compact, this same property was also creating a serious problem after the compact was formed and was cooling.

A partial solution to this problem was achieved by providing extended periods for cooling each compact at a high pressure maintained in the press. This method helped maintain the polycrystalline structure intact as the solidifying silicon was forced to extrude to accommodate for its expansion. However, this method proved unsatisfactory in that it reduced the efficiency of compact production in terms of press utilization and manpower requirements. In addition, even with very slow cooling, (up to ten minutes total), about half of the compacts still showed cracks. Also, it is the inventors' belief that in all cases the remaining silicon induced at least some residual strain in the polycrystalline structure thus weakening the compacts.

Another problem with using elemental silicon in the catalyst/binder system of a polycrystalline CBN compact is the fact that elemental silicon is a relatively soft material. In particular, because elemental silicon is not particularly hard or wear-resistant, the residual elemental silicon detracts from the hardness or wear resistance of the compact.

Another problem inherent in most polycrystalline CBN compacts, including the compact produced according to the inventors' co-pending application Ser. No. 666,459, is the fact that they cannot be cut with a conventional Electric Discharge Machine (EDM). The EDM, which uses an electrical spark to cut, has proven quite effective in cutting precision shapes in ultra-wear-resistant and otherwise difficult to cut materials such as polycrystalline diamond with a metallic binder and cemented tungsten carbide. Unfortunately however, this same method has not been successful with polycrystalline CBN. For example, neither the metal-backed CBN compact marketed by the General Electric Company under the trade name "BZN" (believed by the inventors to be produced by the process disclosed in U.S. Pat. No. 3,743,489), nor the indexable CBN compact marketed by DeBeers under the trade name "Amborite" (believed by the inventors to be produced by the process disclosed in U.S. Pat. No. 3,944,398) can be cut with an EDM. As a result, required shapes for polycrystalline CBN tool inserts and the like must be obtained by either molding the end shape in the press, grinding, or other difficult and expensive techniques.

It is interesting to note that the "BZN" compact has a metallic binder phase and is electrically conducting. The CBN compact of the inventor's co-pending application Ser. No. 666,459 is likewise electrically conducting. As a result, one would expect that these two compacts would behave like polycrystalline diamond compacts with metallic binders which are EDM cuttable. As to the reason for the difference, it is the inventors' understanding that although a spark can be initiated through the metallic binder phase, the CBN adjacent to the spark reverts either to hexagonal boron nitride ("HBN", the low pressure form) or to a $B_2O_3$ glass, both of which are non-conducting and could coat and thereby insulate the adjacent metallic binder phase, thus quenching the spark. In contrast, the diamond in the polycrystalline diamond compact reverts to graphite (the low pressure form) which is conducting and therefore maintains the spark.

There is one metal-backed CBN compact, which is marketed by Sumitomo under the trade name "Sumiboron" and believed by the inventors to be made by one of the processes disclosed in U.S. Pat. No. 4,343,651 or U.S. Pat. No. 4,334,928, that can be cut by EDM. The relatively large volume fraction (up to 40% of the total volume of the compact) of metallic titanium carbide or titanium nitride contained in this compact's binder material is believed to impart this property. However, this high volume fraction of binder material also inhibits intercrystalline CBN bonding and reduces the abrasion resistance of the compact.

OBJECTS OF THE INVENTION

It is therefore the general object of the present invention to cope with the aforementioned problems. It is a specific object of the present invention to provide a process of producing a polycrystalline CBN compact with substantial intercrystalline bonding which process utilizes elemental silicon in its catalyst/binder system and which does not exhibit the problems of cracking previously experienced. It is also a specific object of the present invention to provide a process for producing a polycrystalline CBN compact which utilizes elemental silicon in its catalyst/binder system which has improved wear properties. It is still another specific object of the present invention to provide a process of producing a polycrystalline CBN compact which can be readily cut with a conventional Electric Discharge Machine. It is yet another specific object of the present invention to provide a sintered polycrystalline CBN compact possessing each of these improvements.

SUMMARY OF THE INVENTION

The present invention relates to an improvement to a process for producing polycrystalline CBN compacts with substantial intercrystalline bonding which utilize elemental silicon in the catalyst/binder system. The improvement comprises incorporating a quantity of carbon or a carbon containing material with the catalyst/binder material. In this way, the elemental silicon is converted to silicon carbide which is harder and more wear-resistant than elemental silicon and also will not expand upon cooling as does elemental silicon. Thus a process is provided in which the advantages of using elemental silicon in the catalyst/binder system are realized while avoiding the otherwise attendant disadvantages.

The added carbon referred to above can be provided in the form of diamond, graphite, carbon black or another carbon containing material such as aluminum carbide, boron carbide, manganese carbide, iron carbide, and the like.

The amount of carbon added can be varied depending on the amount of elemental silicon present as well as other factors such as the desired final properties of the compact. Generally, the atomic ratio between the added carbon and the elemental silicon can range from 1:2 to 2:1, and is preferably 1:1. Also, the binder material can comprise from 3 to 30 volume percent of the starting materials for the compact.

The carbon can be added to the system by simply mixing the carbon source, typically in powdered form, with the other constituents of the catalyst/binder system, also typically in powdered form, either before or after being added to the quantity of CBN crystals to be pressed. The CBN crystals and the catalyst/binder system are then placed in a protective container, which is in turn placed in the working chamber of a suitable high pressure, high temperature apparatus. The container and its contents are then subjected to elevated pressure conditions in excess of 20 kbar, preferably to between about 45 and 65 kbar, and then to elevated temperature conditions, preferably to between 1200° and 1600° C. These conditions are in the region of CBN crystal stability. Elevated pressure and temperature is maintained for a period of between approximately 1 and 10 minutes to effect intercrystalline bonding between the CBN crystals. The pressure is then reduced and the compact recovered.

Additional features and advantages of the invention are described in and will appear from the description of the preferred embodiments.

DESCRIPTION OF THE PREFERRED EMBODIMENT

In the preferred embodiment of the present invention, CBN powder of a grain size suitable for the intended application of the compact is blended with a range of finer CBN grains to provide maximum packing density and is thoroughly blended with a powder of the binder. As finer-grained compacts give greater impact resistance and perform suitably in aggressive cutting applications, and give smoother surfaces in finishing applications; a CBN grain size less than about 15 microns is preferred. Most preferred is a mixture of approximately 75% of about 8–12 micron size CBN grains, with a semi-log distribution of smaller grain sizes down to about 1 micron.

The preferred binder system is the same as that preferred in the inventors' co-pending application Ser. No. 666,459 with the exception that the binder system of the present invention will additionally include an amout of a carbon containing material. In particular, the non-carbon containing constituents of the preferred binders are mixtures of silicon and aluminum powders, powdered alloys of aluminum and silicon, such as $Al_{0.3}Si_{0.7}$, or mixtures thereof. Most preferably, the binder contains a mixture of silicon and aluminum powders. It should be noted that the scope of the invention also extends to processes to make CBN compacts which use catalyst/binder systems comprising elemental silicon. In addition, as the inventors use the term "elemental silicon", it is intended to include alloys of silicon.

The amount of binder material (including the carbon containing material) added to the CBN in the preferred embodiment is between 10 and 30 volume percent, with 15–20% being most preferable. Details on the selection of these percentages are given in the inventors' co-pending application referred to above. Generally, the object is to provide enough but not too much of the binder material. That is, depending on factors such as the grain size of the CBN, there is a minimum amount which will provide the desired catalyst/solvent activity. Likewise there is an upper limit beyond which the binder system by its volume alone will excessively interfere with the intercrystalline bonding of the CBN to itself.

Diamond is the preferred form in which the carbon is added to the binder system of the present invention. In particular, diamond grains, which are preferably smaller than the CBN grains, are added to the binder system. One benefit to using diamond grains as the source of the added carbon is that it provides for less volume reduction upon pressing of the sample cell as compared to the volume reduction if graphite is used. This is illustrated by the following chemical reactions showing the percent volume change between reactants and products:

| | |
|---|---|
| $Si + C(diamond) \rightarrow SiC$ | (−18.8%) |
| $Si + C(graphite) \rightarrow SiC$ | (−28.1%) |
| $Al_4C_3 + 3Si + 4BN \rightarrow 3SiC + 4AlN + 4B$ | (−14.9%) |
| $B_4C + Si \rightarrow SiC + 4B$ | (−9.5%) |

As a result, when diamond is used as opposed to graphite, there is less shrinkage of the contents of the pressing cell. This is advantageous as it decreases the amount of follow through needed by the pressing cell. It is also advantageous when forming specific shapes of the CBN compact in the press.

Another benefit in using diamond as the carbon source is that because diamond has such high hardness, it enhances the pressing of the CBN compact. In particular, because the diamond is not compressed, it provides hard surfaces against which the CBN is pressed thereby improving the pressure distribution throughout the cell during the application of pressure from without.

Still another benefit in using diamond as the carbon source is that, because diamond is even more wear resistant than CBN, its presence in and of itself would not compromise the wear resistance of the compact.

It bears noting that experiments produced favorable results when using graphite, aluminum carbide, and boron carbide. Accordingly, using these as well as other carbon containing materials is considered within the scope of this invention.

In particular, certain carbon-containing materials, such as the aluminum carbide in example 13, also provide a desirable reducing function. This property is beneficial in reducing surface oxides on the boron nitride. In addition to aluminum carbide, the salt-like carbides provide this result. These includes scandium carbide, yttrium carbide, the lanthanide carbides, lithium carbide, as well as group II-A carbides, such as calcium carbide. Certain group IA-carbon compounds, such as potassium graphite, may also have this beneficial property.

In the preferred embodiment, the amount of the carbon containing material which is added to the binder material is selected so as to provide an atomic ratio of carbon to silicon in the range of approximately 1:2 to 2:1. Most preferably, the ratio is 1:1. This 1:1 atomic ratio is most preferable because it provides enough carbon but not too much. That is, it is desirable to provide enough carbon in order to ensure that all of the elemental silicon is converted to silicon carbide. Also, it is preferable to provide only enough carbon so that there is as little free carbon as possible remaining in the compact at the completion of the pressing. X-ray difraction data from compacts produced with a 1:1 ratio between the carbon and the silicon show that there is no significant residue of elemental silicon left in the compact. In other words, the reaction of silicon with carbon to produce silicon carbide is sufficiently driven so that an excess of carbon is not required to convert all of the silicon.

As an alternative, it may be desirable to use more carbon containing material than necessary with the intention of incorporating it in the compact produced. Experiments with diamond (see Example 10 below) show that at least a 2:1 ratio is not detrimental. However as noted above, it is undesirable to include so much of any material that by its volume alone it would excessively interfere with the desired intercrystalline bonding of the CBN to itself. Also, in that CBN is more chemically stable in certain applications, it may be undesirable to leave more than a slight amount of diamond in the compact produced.

It may also be desirable to use less than a 1:1 ratio of carbon to silicon. Experiments (see Example 8 below) show that a 1:2 ratio produced a compact without cracking. It is possible that some of the elemental silicon reacted with the molybdenum container in which the compact was passed, thereby producing molybdenum disilicide which would be preferable to free silicon.

In the preferred embodiment, the constituents of the binder material (including the carbon containing material) are in powdered form. They can either be mixed before or simultaneously with being added to the a quantity of CBN.

As an alternative to mixing the binder and the CBN, the binder material may be placed as a separate mass (whether as mixture, pre-alloyed powder, or preformed solid masses) adjacent to the CBN grains where it will infiltrate the mass of CBN grains during pressing, aided by its low viscosity, high wetting action, and the driving force of the extreme high pressure. To avoid premature formation of silicon carbide the carbon-containing constituent should be pre-mixed with the CBN crystals. Nevertheless, since pre-wetting of the CBN grains prior to final compaction in the press cycle is thought to be important, pre-mixing of the powders is currently preferred over such infiltration.

To prepare for pressing the CBN in the preferred embodiment, the powders may be heated in vacuum, either separately or after mixing, so as to remove absorbed water vapor and other volatile impurities, but the chemical reducing power of the aluminum phase is sufficient to handle minor amounts of such impurities. Accordingly, in practice this step may be deleted.

The mixture of CBN with the binder material, including the carbon containing material, is preferably placed in a can or cup of a material suitable to contain the compact while it is being sintered and to protect it from impurities generated by heating the high pressure cell. Careful selection of container materials will minimize infiltration of undesirable elements into the compact or, alternatively, provide for infiltration of desirable elements. Molybdenum has been found particularly suitable and is most preferred. In addition, nickel, tantalum, tungsten, and stainless steel may also be used. Titanium and zirconium enclosures, on the other hand, have been found to be too reactive toward CBN in the presence of molten silicon-aluminum to be of utility when using the most preferred binder material of this invention.

The cup or can may be approximately of the same net shape as the finished compact, in order to reduce finishing costs. Likewise, the can may be subdivided with discs dividers, molds, etc., to produce multiple near-net shapes.

Ceramic, metallic or cermet substrate materials may be placed adjacent to the CBN mass if a composite compact having certain mechanical characteristics or special (particularly non-planar shape) is desired. Also, a barrier material may be provided to prevent undesirable reactions between the CBN mass and the substrate material. Importantly, the inventors have found the compact of the present invention to be sufficiently strong and impact resistant to be used directly as a tool insert without need for a integrally-bonded support mass. Accordingly, such a substrate may not be needed for many applications.

There are certain applications for CBN compacts, such as drilling tools, in which there is no room for a clamping fixture. For these applications it is often desirable to attach the CBN insert to the tool support by means of brazing. Brazing to a CBN compact is best facilitated by bonding it to a metallic substrate as described above, or by providing the compact with a well-adhering metallic coating. Such a metallic coating may be formed on the compact by electroless plating or electroplating (since the compact is electrically conductive), vacuum evaporation or sputtering, or other conventional metallization techniques.

In the preferred embodiment, the cup or can enclosing the mass to be sintered is surrounded by any well-known plastic pressure-transmitting medium. A salt such as NaCl is preferred for this medium, but hexagonal boron nitride, talc, etc, may also be utilized. The cup and medium are placed within a graphite or metallic heater, surrounded by a pressure-transmitting and gasket-forming medium such as pyro-phyllite, and then placed in the chamber of a suitable high-pressure, high-temperature apparatus. One such suitable combination of pressure-cell and apparatus is illustrated in U.S. Pat. No. 3,913,280 to Hall, Sr., FIGS. 2 and 3, which patent is incorporated herein by reference. After pressure in excess of about 20 kbar is applied to bring the sample into the region of CBN thermodynamic stability, which is well known to those skilled in the art, electrical resistance heating is applied to melt the binder and sinter the compact to maximum density. The preferred sintering time at the preferred conditions of 45-60 kbar and 1250°-1450° C. is about three minutes. To increase efficiency of the plastic flow during sintering, temperatures as high as 1600° C. may be utilized. Longer times will impart only small increases in density and extent of intercrystalline bonding.

It should be noted that differing press and cell designs may require different pressures, temperatures, and pressing times. It is considered within the ordinary skill in the art to experimentally determine the optimum conditions for practicing the present invention in these differing press and cell designs. Generally, lower pressures or temperatures will require longer sintering times.

After sintering is complete, the heating current is removed and the applied pressure is removed, after which the can or cup is recovered from the cell. The compact is recovered from the can by grit blasting or acid dissolution, following which it is ground or lapped with diamond abrasives.

Surprisingly, the preferred embodiment is capable of being cut into precision shapes by a conventional EDM. Because the compact of the inventors' co-pending application referred to above is also electrically conducting but cannot be cut by EDM, this result was completely unanticipated.

While not wishing to be bound by any particular theory, the inventors have speculated that perhaps the silicon carbide (which is a semi-conductor, as is silicon, from which it is formed) produced in the present invention is made highly conductive by means of degenerative "p-type" doping by the boron which is generated by the reaction:

Al+BN→AlN+B

It is known that boron-doped silicon carbide can be cut by EDM (see e.g. U.S. Pat. No. 3,968,194 to Prochazka). However, it is not completely understood why the compact is not insulated when the CBN phase disintegrates into HBN and $B_2O_3$ as is thought to be the case when trying to EDM cut the compact labeled "BZN". Perhaps the carbon liberated by the disintegration of the silicon carbide provides sufficient conductivity to overcome the insulating effect of the HBN or $B_2O_3$.

This feature, i.e. the fact that the compact of the present invention can be cut with a conventional EDM, is highly advantageous as it facilitates finishing of the CBN compact into a wide variety of shapes with great precision, and obvious economic benefits. The necessity of providing precision metal forms for molding non-circular shapes in the press is eliminated. Likewise, inventory requirements are greatly reduced, as orders can be readily filled by cutting specified shapes and sizes from stock CBN compact discs.

EXAMPLES

Examples 1–14

Examples 1–14 illustrate various embodiments of the invention which have been practiced. Table 1 summarizes the composition of the binder (giving weight percent of aluminum, based on total binder weight), binder concentration (volume percent based on total compact volume), atomic ratio of silicon to carbon, and the extent of cracking observed in the finished compact (0: none detectable at 100X magnification; 1: some minor cracking observed).

TABLE 1

| Example No. | Binder const. | Al Wt % | Binder Vol % | C/Si At Ratio | cracking 0 = none |
|---|---|---|---|---|---|
| 1 | Si/Al/diamond | 30 | 5.0 | 1.0 | 0 |
| 2 | Si/Al/diamond | 30 | 10.0 | 1.0 | 0 |
| 3 | Si/Al/diamond | 30 | 15.0 | 1.0 | 0 |
| 4 | Si/Al/diamond | 30 | 17.0 | 1.0 | 0 |
| 5 | Si/Al/diamond | 30 | 20.0 | 1.0 | 1 |
| 6 | Si/Al/diamond | 30 | 25.0 | 1.0 | 1 |
| 7 | Si/Al/diamond | 30 | 5.0 | 0.5 | 0 |
| 8 | Si/Al/diamond | 30 | 17.0 | 0.5 | 0 |
| 9 | Si/Al/diamond | 30 | 5.0 | 2.0 | 1 |
| 10 | Si/Al/diamond | 30 | 17.0 | 2.0 | 1 |
| 11 | Si/Al/coarse d. | 30 | 17.0 | 1.0 | 0 |
| 12 | Si/Al/graphite | 30 | 17.0 | 1.0 | 0 |
| 13 | Si/Al/Al$_4$C$_3$ | 56 | 17.0 | 1.0 | 0 |
| 14 | Si/Al/B$_4$C | 30 | 16.1 | 1.0 | 0 |

Quantities of binder constituents necessary to provide the composition indicated in Table 1 were thoroughly mixed with CBN powder having a size distribution of approximately 72% (by weight) 8–12 microns, 23% 4–8 microns and 5% 2–4 microns, using acetone in a tungsten carbide-lined ball mill with carbide balls. Milling time and speed were selected so as to provide thorough mixing with negligible contamination from the mill. After drying in air, the mixture was treated alternately in vacuum and hydrogen at 800° C. for 30 minutes to remove moisture and volatile impurities. The mixture was packed into a molybdenum cup (0.625" diameter, 0.19" high, 0.010" wall thickness) and pre-compacted by a steel plunger in a steel die to a pressure of approximately 40,000 p.s.i. The cup was then double-sealed with an overlapping molybdenum cup. Two such assemblies were placed in the sample cavity of a cubic high pressure cell such as described in U.S. Pat. No. 3,913,280, placing salt (NaCl) between the sample assemblies and the walls of the graphite resistance heater to provide electrical insulation and pressure transmission.

After pressurization to approximately 55 kbar, the temperature was raised to approximately 1450 C. in about 30 seconds, held at temperature for 150 seconds, then lowered to approximately 800 C. over a period of 190 seconds. The pressure was removed and the CBN compacts recovered by removing the molybdenum cup in 50/50 hydrochloric acid-nitric acid mixture.

Although CBN compacts prepared according to the process described in the inventors' co-pending U.S. application Ser. No. 666,459 invariably exhibited a metallic-appearing surface layer of silicon or molybdenum silicide after removal of the can; none of the compacts here described exhibited such a layer, except for example 8, (17 volume % binder, 1:2 carbon:silicon atomic ratio), in which the amount of extruded surface material was considerably reduced relative to the equivalent compact produced with no added carbon.

The extent of cracking is indicated in the table by a number 0 for no detectable cracking at 100X magnification; 1 for mild cracks detected visually but having little effect on compact performance. In all cases the extent of cracking was much less severe than with compacts made with similar composition and sintering conditions but without any source of carbon in the binder. In most of the examples, cracking of the compact due to silicon expansion was completely eliminated, or else the extent of cracking was considerably reduced relative to compacts produced without carbon as a binder constituent.

Several of the compacts were ground with a resin-bonded diamond wheel into cylindrical cutters with a diameter of 0.500" and thickness of 0.125", clamped into a standard toolholder with a 15 degree negative rake angle, and used to cut D-2 steel hardened to a bulk hardness of 60 (Rockwell C scale). Using a depth of cut of 0.010" and a feed of /0.002", comparative cutting tests were performed at cutting speeds of 1,200, 5,000, and 13,800 surface feet per minute. At the lower speeds, these compacts generally exhibited 1.5 to 3 times better life relative to CBN compacts of similar composition made at similar sintering conditions but without a source of carbon in the binder. Example 1 performed the best out of examples 1–6 at the higher, 13,800 surface feet per minute, cutting speed. Example 6 had the best performance out of this same group on the lower, 1,200 surface feet per minute, cutting speed.

In cutting hardened steel at the highest test speed, however, the performance of the compact of this invention was slightly inferior to that of its equivalent compact lacking carbon additive. At present, the CBN compacts of this invention appear generally to perform best in cutting of extremely hard or highly abrasive ferrous materials, using larger depths of cut but lower speeds than the compacts of U.S. application Ser. No. 666,459.

Examples 1–12 represent an improvement to the invention of the inventors' co-pending application Ser. No. 666,459, (Aluminum/Silicon binder system). In examples 1–10 diamond powder of size smaller than five microns was utilized as the carbon source. In example 11, diamond crystals of approximately 60 microns average size were used to establish a rough measure of the rate of reaction and consumption of diamond. In example 12, graphite was substituted for diamond. X-ray diffraction spectra of all of the examples indicated that regardless of the diamond/silicon ratio, diamond size, or whether the carbon was initially present as diamond or graphite, substantially all available carbon or silicon was converted to silicon carbide, with the element in stochiometric excess remaining unreacted, indicating complete and rapid reaction to form SiC, regardless of the amount or type of carbon source.

Examples 1,3,4, and 10 represent the most preferred embodiments of the invention, due to the superior abrasion resistance, strength, and absence of cracks observed with these compositions.

Example 15

As a further example of a preferred embodiment of the invention, a powder mixture having the composition of example No. 4 was sintered and bonded in one pressing step adjacent to a previously sintered tungsten-carbide/cobalt disc. A transition layer between the CBN phase and the tungsten carbide disc was utilized to avoid cross migration between the two. Sintering conditions were identical to those of examples 1–14. Because cobalt from the carbide backing was prevented by the transition layer from migrating into the CBN, the CBN layer itself was substantially the same as that of the indexable, non-backed insert of example No. 4. An extremely tough and abrasive hard facing material incorporating carbides, known as "Satellite HC-1" was applied by welding to a 5-inch diameter steel mandrel and was cut on a lathe with the compact with a depth of cut of 0.100 inch, feed of 0.001 to 0.002 inches, and speed of 700 surface feet/minute. In this application, the compact of the invention was found to exhibit significantly greater wear resistance than the commercially-available "BZN" compact.

We claim:

1. A process for preparing a sintered polycrystalline CBN compact with substantial intercrystalline bonding which comprises:
    forming a mixture of grains of CBN with a minor amount of a binder material comprised of silicon, and a carbon containing material, wherein the amount of carbon containing material is selected so as to provide an atomic ratio of carbon to silicon which is between 1:2 to 2:1;
    subjecting the mixture to elevated temperature and pressure conditions at which the CBN is thermodynamically stable; and
    maintaining the elevated conditions for a time sufficient to allow for substantial intercrystalline bonding to thereby sinter the compact.

2. The process of claim 1 wherein the carbon containing material comprises diamond.

3. The process of claim 2 wherein the amount of diamond is selected so as to provide an atomic ratio of carbon to elemental silicon which is approximately equal to 1:1.

4. The process of claim 2, wherein the amount of diamond is selected so as to ensure that substantially all of the elemental silicon is converted to silicon carbide upon pressing.

5. The process of claim 2 wherein the binder material is present in a volume percent of between 3 and 30 percent of the mixture.

6. The process of claim 2 wherein the binder material is present in a volume percent of between 15 and 20 percent of the mixture.

7. The process of claim 1 wherein the carbon containing material comprises graphite.

8. The process of claim 7 wherein the amount of graphite is selected so as to provide an atomic ratio of carbon to elemental silicon which is approximately equal to 1:1.

9. The process of claim 2 wherein the amount of graphite is selected so as to ensure that substantially all of the elemental silicon is converted to silicon carbide upon pressing.

10. The process of claim 7 wherein the binder material is present in a volume percent of between 3 and 30 percent of the mixture.

11. The process of claim 7 wherein the binder material is present in a volume percent of between 15 and 20 percent of the mixture.

12. The process of claim 1 wherein the carbon containing material is selected from the group consisting of carbon, diamond, graphite, carbon black, aluminum carbide, boron carbide, lithium carbide, calcium carbide, lanthanum carbide, or cerium carbide, as well as combinations thereof.

13. The process of claim 12 wherein the amount of carbon containing material is selected so as to provide an atomic ratio of carbon to elemental silicon which is approximately equal to 1:1.

14. The process of claim 12 wherein the amount of carbon containing material is selected so as to ensure that substantially all of the elemental silicon is converted to silicon carbide upon pressing.

15. The process of claim 12 wherein the binder material is present in a volume percent of between 3 and 30 percent of the mixture.

16. The process of claim 12 wherein the binder material is present in a volume percent of between 15 and 20 percent of the mixture.

17. A sintered polycrystalline CBN compact produced according to claims 1, 2, 3, 4, 5, 6, 7, 8, 9, 10, 11, 12, 13, 14, 15, or 16.

18. A process for preparing a sintered polycrystalline CBN compact with substantial intercrystalline bonding which comprises:
    forming a mixture of grains of CBN with a minor amount of a binder material consisting essentially of silicon, a carbon containing material, and an aluminum-containing material selected from the group consisting of aluminum alone, aluminum with aluminum nitride, aluminum with aluminum diboride, or aluminum with aluminum nitride and aluminum diboride;
    pressing the mixture to elevated temperature and pressure conditions at which conditions the CBN is thermodynamically stable; and
    maintaining the elevated conditions for a time sufficient to allow for substantial intercrystalline bonding to thereby sinter the compact.

19. The process of claim 18 wherein the carbon containing material comprises diamond.

20. The process of claim 18 wherein the amount of diamond is selected so as to provide an atomic ratio of carbon to elemental silicon which is between 1:2 and 2:1.

21. The process of claim 19 wherein the amount of diamond is selected so as to provide an atomic ratio of carbon to elemental silicon which is approximately equal to 1:1.

22. The process of claim 19 wherein the amount of diamond is selected so as to ensure that substantially all of the elemental silicon is converted to silicon carbide upon pressing.

23. The process of claim 19 wherein the binder material is present in a volume percent of between 3 and 30 percent of the mixture.

24. The process of claim 19 wherein the binder material is present in a volume percent of between 15 and 20 percent of the mixture.

25. The process of claim 18 wherein the carbon containing material comprises graphite.

26. The process of claim 25 wherein the amount of graphite is selected so as to provide an atomic ratio of carbon to elemental silicon which is between 1:2 and 2:1.

27. The process of claim 25 wherein the amount of graphite is selected so as to provide an atomic ratio of carbon to elemental silicon which is approximately equal to 1:1.

28. The process of claim 25 wherein the amount of graphite is selected so as to ensure that substantially all of the elemental silicon is converted to silicon carbide upon pressing.

29. The process of claim 25 wherein the binder material is present in a volume percent of between 3 and 30 percent of the mixture.

30. The process of claim 25 wherein the binder material is present in a volume percent of between 15 and 20 percent of the mixture.

31. The process of claim 18 wherein the carbon containing material is selected from the group consisting of carbon, diamond, graphite, carbon black, aluminum carbide, boron carbide, lithium carbide, calcium carbide, lanthanum carbide, or cerium carbide, as well as combinations thereof.

32. The process of claim 31 wherein the amount of carbon containing material is selected so as to provide an atomic ratio of carbon to elemental silicon which is between 1:2 and 2:1.

33. The process of claim 31 wherein the amount of carbon containing material is selected so as to provide an atomic ratio of carbon to elemental silicon which is approximately equal to 1:1.

34. The process of claim 31 wherein the amount of carbon containing material is selected so as to ensure that substantially all of the elemental silicon is converted to silicon carbide upon pressing.

35. The process of claim 31 wherein the binder material is present in a volume percent of between 3 and 30 percent of the mixture.

36. The process of claim 31 wherein the binder material is present in a volume percent of between 15 and 20 percent of the mixture.

37. A sintered polycrystalline CBN compact produced according to claims 18, 19, 20, 21, 22, 23 24, 25, 26, 27, 28, 29, 30, 31, 32, 33, 34, 35, or 36.

* * * * *